United States Patent
Bradshaw et al.

(10) Patent No.: US 8,998,187 B2
(45) Date of Patent: Apr. 7, 2015

(54) MULTI-STAGE SWITCHABLE INERTIA TRACK ASSEMBLY

(75) Inventors: Jeff Bradshaw, St. Marys (CA); Andrew Hartgers, Ilderton (CA)

(73) Assignee: Cooper-Standard Automotive Inc., Novi, MI (US)

( * ) Notice: Subject to any disclaimer, the term of this patent is extended or adjusted under 35 U.S.C. 154(b) by 421 days.

(21) Appl. No.: 12/860,192

(22) Filed: Aug. 20, 2010

(65) Prior Publication Data

US 2011/0024960 A1 Feb. 3, 2011

Related U.S. Application Data

(63) Continuation-in-part of application No. PCT/US2009/034907, filed on Feb. 23, 2009.

(60) Provisional application No. 61/030,360, filed on Feb. 21, 2008.

(51) Int. Cl.
F16F 5/00 (2006.01)
F16F 13/26 (2006.01)

(52) U.S. Cl.
CPC .................................... F16F 13/262 (2013.01)

(58) Field of Classification Search
USPC .............. 267/140.13, 140.14, 140.15, 140.11
See application file for complete search history.

(56) References Cited

U.S. PATENT DOCUMENTS

| | | | |
|---|---|---|---|
| 4,742,999 A | | 5/1988 | Flower |
| 4,889,325 A | | 12/1989 | Flower et al. |
| 5,167,403 A | * | 12/1992 | Muramatsu et al. ..... 267/140.13 |
| 5,571,264 A | * | 11/1996 | Maruyama et al. ...... 267/140.14 |

(Continued)

FOREIGN PATENT DOCUMENTS

| | | |
|---|---|---|
| JP | 2000 257665 | 9/2000 |
| JP | 2001 140971 | 5/2001 |

(Continued)

OTHER PUBLICATIONS

Machine Translation of JP 2005-214358.*

(Continued)

*Primary Examiner* — Nicholas J Lane
(74) *Attorney, Agent, or Firm* — Fay Sharpe LLP

(57) ABSTRACT

A two vacuum actuated switch mechanism is provided within an engine or hydromount. First and second ports are provided along a peripheral portion of an inertia track assembly. A decoupler or vacuum diaphragm is selectively exposed to vacuum through a first port. Under the influence of the vacuum, the decoupler can no longer oscillate. If vacuum is applied only to the decoupler, and not and idle diaphragm, the fluid is forced through a low frequency inertia track which creates high levels of damping and low frequencies. If vacuum is also applied to the decoupler and the idle diaphragm, the high frequency inertia track is opened and causes the fluid to flow therethrough. This creates a high frequency dynamic rate dip. Alternatively, if no vacuum is applied to either the decoupler or the idle diaphragm, the decoupler is allowed to freely oscillate creating a decoupled state for low input displacements. Higher input displacements results in fluids being forced through the low frequency inertia track. An integrated accumulator is disposed between the port and the decoupler to reduce or eliminate air resonance response, buffering the pumping effect of the decoupler in a decoupled state.

18 Claims, 11 Drawing Sheets

(56) References Cited

U.S. PATENT DOCUMENTS

| | | | |
|---|---|---|---|
| 6,017,024 A * | 1/2000 | Muramatsu et al. | 267/140.14 |
| 6,708,963 B2 * | 3/2004 | Nishi et al. | 267/140.14 |
| 2003/0011117 A1 * | 1/2003 | Nishi et al. | 267/140.14 |
| 2003/0098533 A1 | 5/2003 | Nishi et al. | |
| 2009/0302515 A1 * | 12/2009 | Graeve et al. | 267/140.13 |
| 2010/0102492 A1 * | 4/2010 | Lee | 267/121 |

FOREIGN PATENT DOCUMENTS

| | | | | |
|---|---|---|---|---|
| JP | 2002 031184 | | 1/2002 | |
| JP | 2003 130124 | | 5/2003 | |
| JP | 2004 044772 | | 2/2004 | |
| JP | 2004 360710 | | 12/2004 | |
| JP | 2005 113978 | | 4/2005 | |
| JP | 2005-207530 A | | 8/2005 | |
| JP | 2005214358 A | * | 8/2005 | F16F 13/26 |

OTHER PUBLICATIONS

PCT/US2009/034907 International Search Report and Written Opinion.

Japanese Application No. 2010-547843 Translated Portion of Office Action.

* cited by examiner

US 8,998,187 B2

MULTI-STAGE SWITCHABLE INERTIA TRACK ASSEMBLY

This application is a continuation-in-part application and claims priority from PCT/US2009/034907, filed 23 Feb. 2009, which claims priority from U.S. provisional patent application Ser. No. 61/030,360, filed 21 Feb. 2008, the disclosures of which are hereby expressly incorporated herein by reference.

BACKGROUND OF THE DISCLOSURE

This disclosure relates to a damper assembly and specifically a multi-stage switchable inertia track assembly. More particularly, the multi-stage switchable inertia track assembly contains both a low frequency inertia track and a high frequency inertia track. The low frequency track is used to create damping to address vehicle smooth road shake. The high frequency track is used to create a high frequency sympathetic resonance to reduce transmission of idle disturbance frequencies from the powertrain to a vehicle body or frame. Selected features may find application in other related environments and applications.

The basic technology for switchable hydraulic engine mounts has been known in the industry for several years. Physical switching of a hydraulic mount from a fluid damped state to a non-damped state by way of opening and closing a port is well understood. However, there are multiple methods by which this can be achieved.

Most vacuum actuated hardware is mounted externally for ease of manufacture. This external mounting tends to reduce the efficiency of the mount response, but it does allow for easier sealing of the hydraulic fluid in the mount assembly. A problem with most conventional designs is that they use a diaphragm that encloses a volume and forms an air spring under the diaphragm and attached to an external port. Opening and closing this external port is the method used to "switch" the mount state, i.e., the stiffness or damping response. In the switch "open" state, air can be pumped to atmosphere from the volume. For example, the hydraulic engine mount has a low bearing spring stiffness with the open switch (the volume is open to atmosphere) and the engine mount damps or insulates idling vibrations (low amplitude, high frequency). In the switch "closed" state, the air in the volume acts as a stiff spring because the volume is closed or sealed and the damping fluid is transferred back and forth between a first or working fluid chamber and a second or compensating fluid chamber to damp high amplitude, low frequency vibrations. The air spring (closed volume) created by the closed port reduces the pressure of the fluid that would otherwise be pumped through the inertia track, as some of the fluid pressure is used to compress the air spring.

Other designs also use a vacuum actuated diaphragm that seals on the diaphragm cover and uses the diaphragm as a seal on the inertia track.

Still other designs use a rotary valve to open and close the port. These rotary valves can rotate either axially or radially with the mount. In either case, sealing of the valve can become an issue, where it is difficult to seal from either the low pressure side of the mount to high or from the high pressure side of the mount to atmosphere.

As with most switchable hydraulic engine mounts this mount is intended to suspend the powertrain, provide damping to powertrain motion, control the powertrain travel, and isolate the powertrain from the vehicle chassis. The switch mechanisms in multi-state mounts allow the mount to switch between four states. Two of the states allow the fluid effect of the mount to be decoupled from compliance vibrations, and the other two states adjust the damping and frequency response of the mount.

Neither an engine mount nor vacuum actuated switching of the states in an engine mount is individually deemed novel per se. However, a need exists for an improved switchable inertia track assembly and associated method of packaging same.

SUMMARY OF THE DISCLOSURE

A multistage switchable inertia track assembly includes a housing, an inertia track received in the housing and having an elongated fluid damped first path that is adapted to communicate with an associated first fluid chamber on a first side and an associated second fluid chamber on a second side, and a non-damped second path that is adapted to communicate with the associated first and second fluid chambers, a decoupler received in the housing that selectively closes at least one of the first and second paths, an idle diaphragm in the housing that selectively controls communication between the first and second fluid chambers to selectively alter the damping, and first and second ports in the housing that communicate with the decoupler and the idle diaphragm, respectively.

A method of manufacturing a multistage switchable inertia track assembly includes providing a housing, positioning an inertia track in the housing that has an elongated fluid damped first path that is adapted to communicate with an associated first fluid chamber on a first side and an associated second fluid chamber on a second side, and a non-damped second path that is adapted to communicate with the associated first and second fluid chambers, securing a decoupler in the housing to selectively close at least one of the first and second paths, supplying an idle diaphragm in the housing to selectively control communication between the first and second fluid chambers and to selectively alter the damping state, and providing first and second ports in the housing to communicate with the decoupler and the idle diaphragm, respectively.

Still other features and benefits will be found in the following detailed description.

DETAILED DESCRIPTION OF THE PREFERRED EMBODIMENTS

Figure 1:
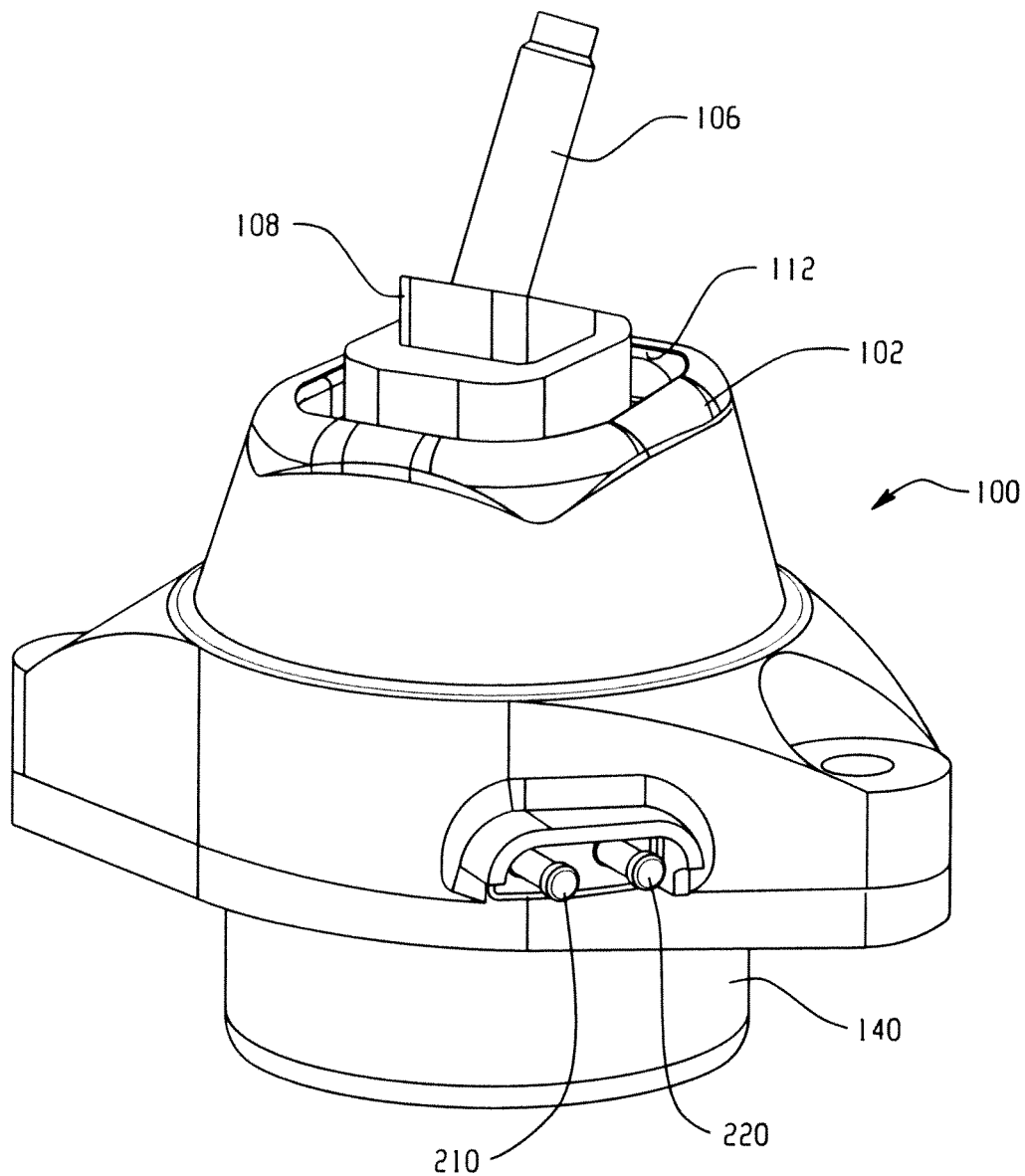
FIG. 1 is a perspective view of an assembled hydraulic engine mount or hydromount.
Figure 2:
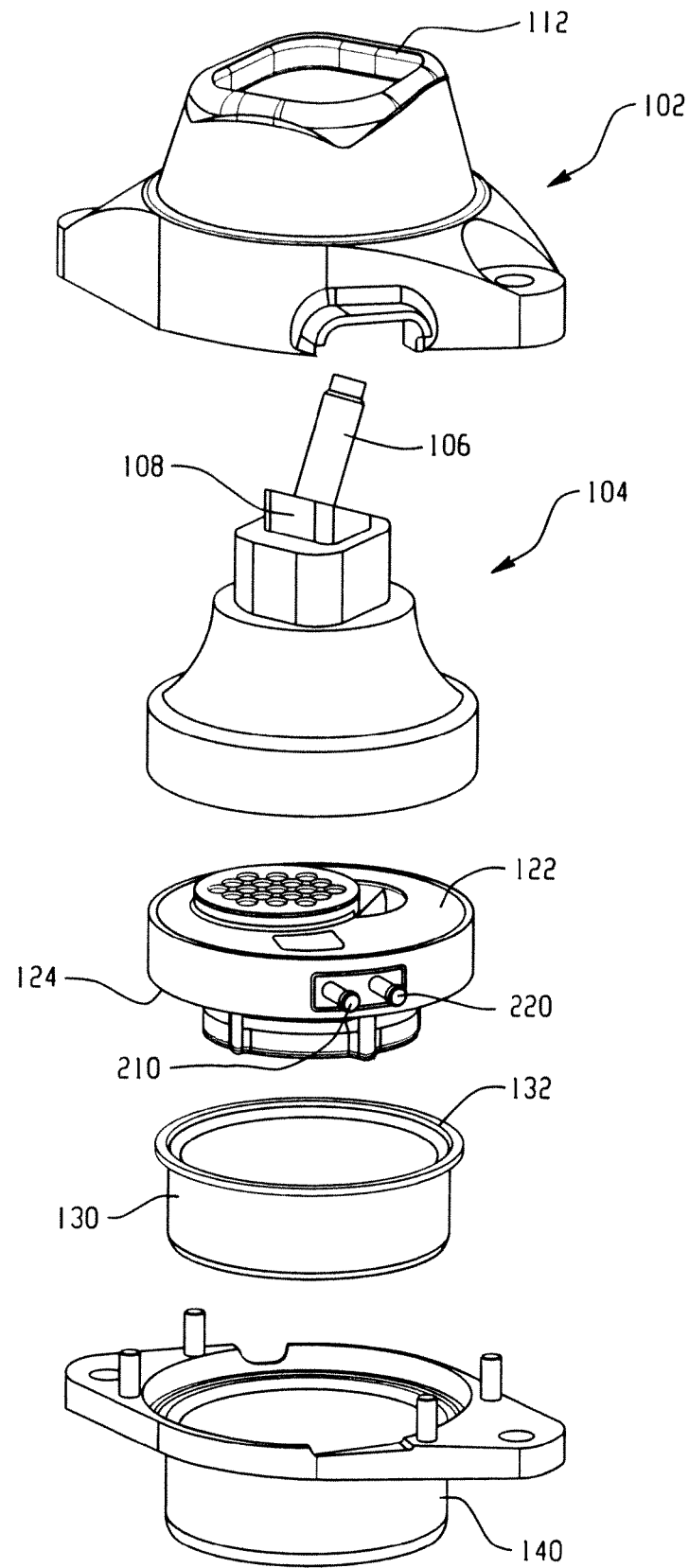
FIG. 2 is an exploded view of various components of the mount assembly of FIG. 1.
Figure 3:
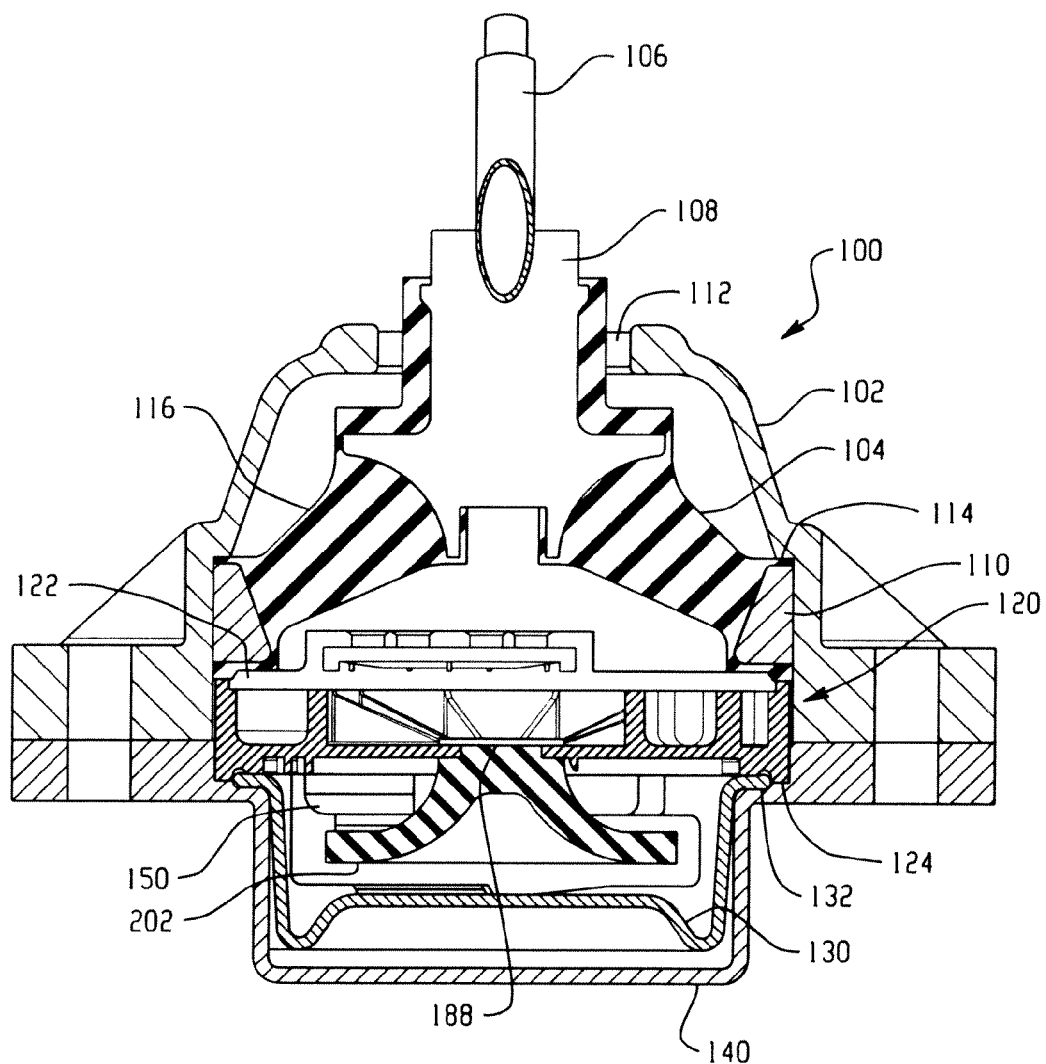
FIG. 3 is a longitudinal cross-sectional view of the assembled mount of FIGS. 1 and 2.

Turning first to FIGS. 1-3, a multi-state vacuum actuated inertia track assembly is shown within an engine mount or hydro-mount assembly 100. More particularly, the mount assembly 100 includes a restrictor or external housing 102 dimensioned to receive a first or elastomeric component or main rubber element 104 that is generally shaped as a truncated cone, and primarily made of an elastomeric material, such as an elastic rubber as is conventional in the art. A fastener or bolt 106 extends outwardly from the main rubber element for fastening to the power train or engine (not shown) in a manner generally known in the art. The fastener cooperates with a metal bearing member 108 that has at least a portion encapsulated within the first elastomeric member 104. In addition, a lower peripheral portion of the main rubber element may include a stiffener, such as metallic stiffener 110, molded within the main rubber element to add rigidity and support.

The main rubber element is received within the restrictor housing 102 so that the fastener 106 extends through a central opening 112 in the restrictor. An internal shoulder 114 (FIG. 3) of the restrictor abuttingly engages the reinforced, lower portion of the main rubber element. In addition, the lower portion of the main rubber element forms a portion of a first or upper fluid chamber 116, namely the high pressure side, of the engine mount. The remainder of the first fluid chamber 116 is defined by the inertia track assembly 120, more specific details of which will be described below. An outer radial portion of an upper surface of the inertia track assembly denoted by reference numeral 122 abuttingly and sealingly engages the main rubber element 104 in order to seal the first fluid chamber 116. As particularly evident in FIG. 3, at least a portion of the inertia track assembly is received within the restrictor housing 102. A second outer radial portion along the lower surface denoted by reference numeral 124 is sealingly engaged by a rubber boot or diaphragm 130, and particularly an upper peripheral portion 132 thereof. The diaphragm 130 is protected by a diaphragm cover 140, preferably formed of a more rigid material than the elastomeric diaphragm, and that matingly engages the restrictor housing 102. When the diaphragm cover 140 is fastened to the restrictor, the lower peripheral edge of the main rubber element 104 and the peripheral portion 132 of the diaphragm sealingly engage opposite sides or faces 122, 124, respectively, of the inertia track assembly 120. As vibrations or displacements are received into the mount from the powertrain, fluid is pumped from the first fluid chamber 116 through the inertia track assembly 120 in different ways. Particularly, and with continued reference to FIGS. 1-3, and additional reference to FIGS. 4 and 5, the inertia track assembly 120 is disposed between the first or upper fluid chamber 116 and the second or lower fluid chamber 150. Thus, the upper side of the inertia track assembly is associated with the high pressure side of the mount. On the other hand, the lower surface of the inertia track assembly is associated with the second or lower fluid chamber 150 and is sometimes referred to as the low pressure side of the mount. The fluid is pumped from the top to the bottom through the inertia track assembly. The path that the fluid takes through the inertia track assembly depends on a decoupler 160 and an idle diaphragm 170. More particularly, the decoupler 160 is preferably a rubber disk or similar structural arrangement received over a portion of a first opening or path 180 through the high frequency inertia track. Thus, the rubber decoupler 160 is dimensioned for close receipt within a cup shaped recess 182 in an upper surface 184 of the housing, which has an opening or path to the high frequency inertia track 180 and particularly a central opening 186 (FIG. 6) that is selectively closed by a central portion 188 of the idle diaphragm 170. Thus, a decoupler cover 190 has a series of openings 192 that allow fluid from the first fluid chamber to pass therethrough, and around the decoupler 160 causing the decoupler to freely oscillate. The path of least resistance from the first/upper fluid chamber 116, to the second/lower fluid chamber 150 disposed above the idle diaphragm 170, i.e., the fluid side of the idle diaphragm is into the high frequency inertia track 180, particularly through opening 194, in addition to passing through opening 186.

Alternatively, a second path, or elongated low frequency inertia track has an opening 196 radially outward of the decoupler cover in the decoupler housing that communicates with a serpentine low frequency inertia track 198 (FIG. 6) that ultimately communicates with opening 200 through a lower surface of the inertia track housing in communication with the second/lower fluid chamber 150. Fluid only flows through this serpentine path 198, however, when the high frequency inertia track path is otherwise blocked. So, for example, where the idle diaphragm is shown in its extended position as shown in FIG. 3, the high frequency inertia track is closed since opening 186 is sealed by the central portion 188 of the idle diaphragm 170. Fluid must then proceed through the low frequency inertia track 198 to exit through opening 200 that communicates with the low pressure side of the mount. As will be appreciated, this occurs when no vacuum is applied to the underside of the idle diaphragm. In addition, the decoupler 160 is allowed to freely oscillate creating a decoupled state for low input displacements. For higher input displacements, the fluid is forced through the low frequency inertia track.

In another state or mode of operation, vacuum is provided to the underside 202 of the idle diaphragm. In this manner, the central port 186 opens and fluid more easily passes from the first or upper fluid chamber 116 to the second or lower fluid chamber 150. Thus, by selective switching of vacuum or negative pressure to the underside 202 of the idle diaphragm, the mount is switched from the high frequency inertia track 180 (vacuum applied, port open) to the low frequency track 198 (vacuum removed, port closed).

Figure 7:
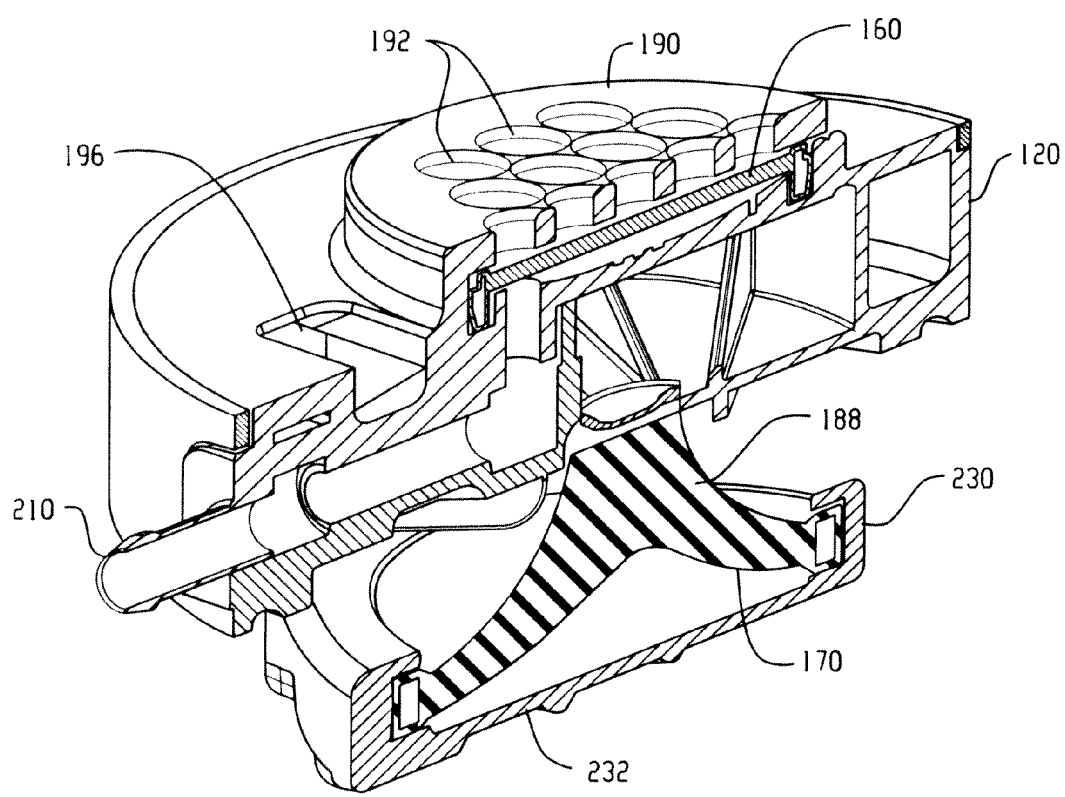
FIG. 7 is a cross-sectional view of the inertia track assembly illustrating a first flow path through the decoupler vacuum port.

Port 210, as shown in FIG. 7, is selectively supplied with negative pressure or vacuum. An external valve such as a solenoid valve is connected to the port 210 and when vacuum is applied to the decoupler port, the decoupler 160 collapses, the decoupler can no longer oscillate.

Figure 8:
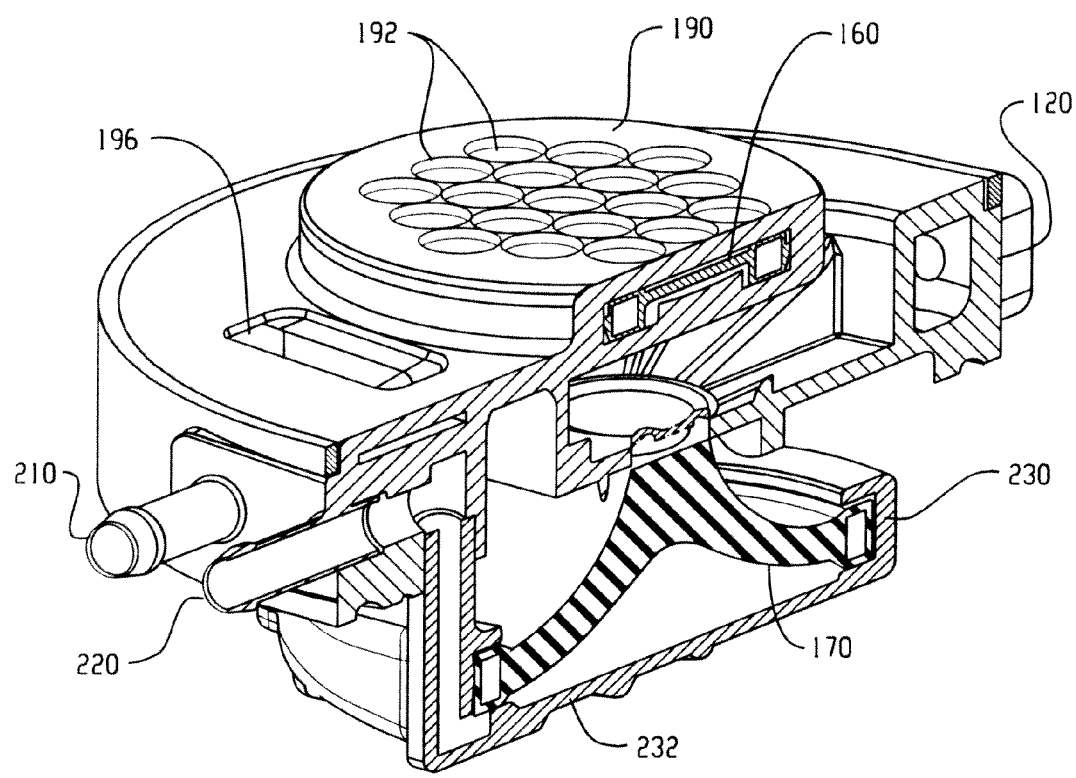
FIG. 8 is a cross-sectional view of the inertia track assembly and illustrating a second flow path of the idle diaphragm vacuum port.
Figure 9:
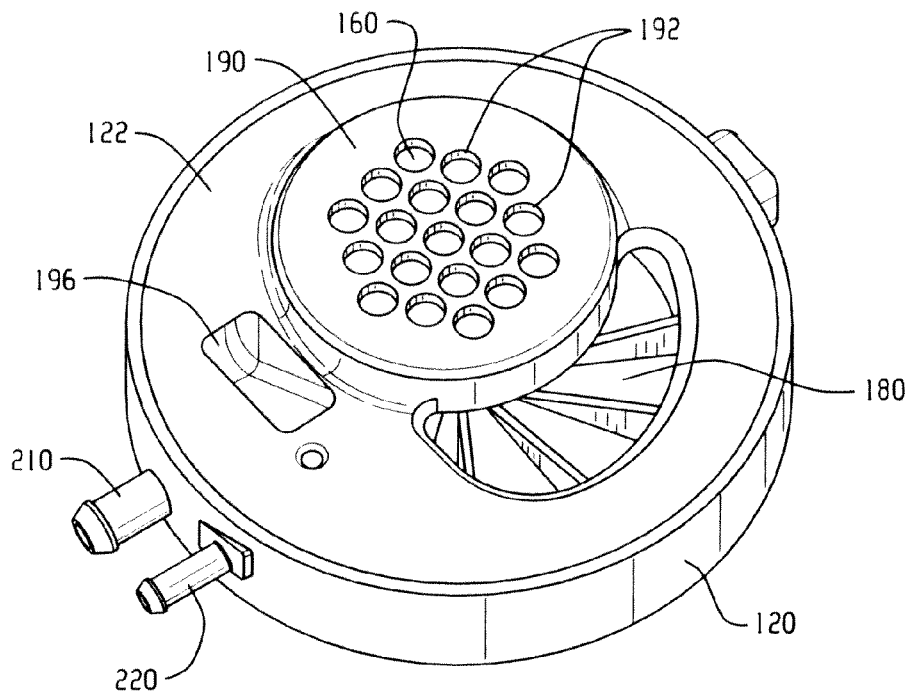
FIGS. 9-14 are perspective views of another embodiment of the inertia track assembly of an engine mount incorporating an integrated accumulator.
Figure 10:
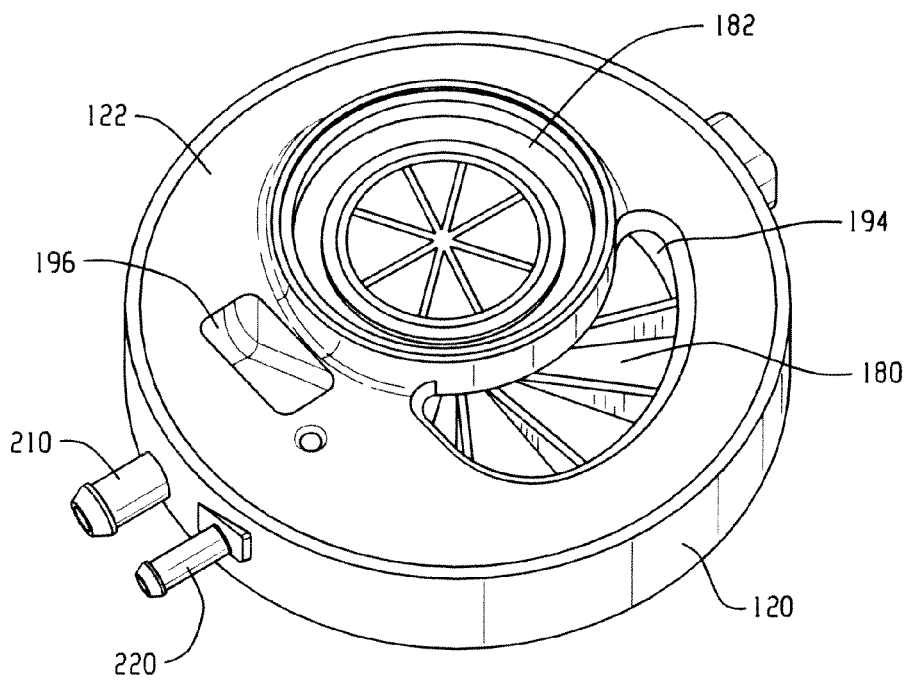
Figure 11:
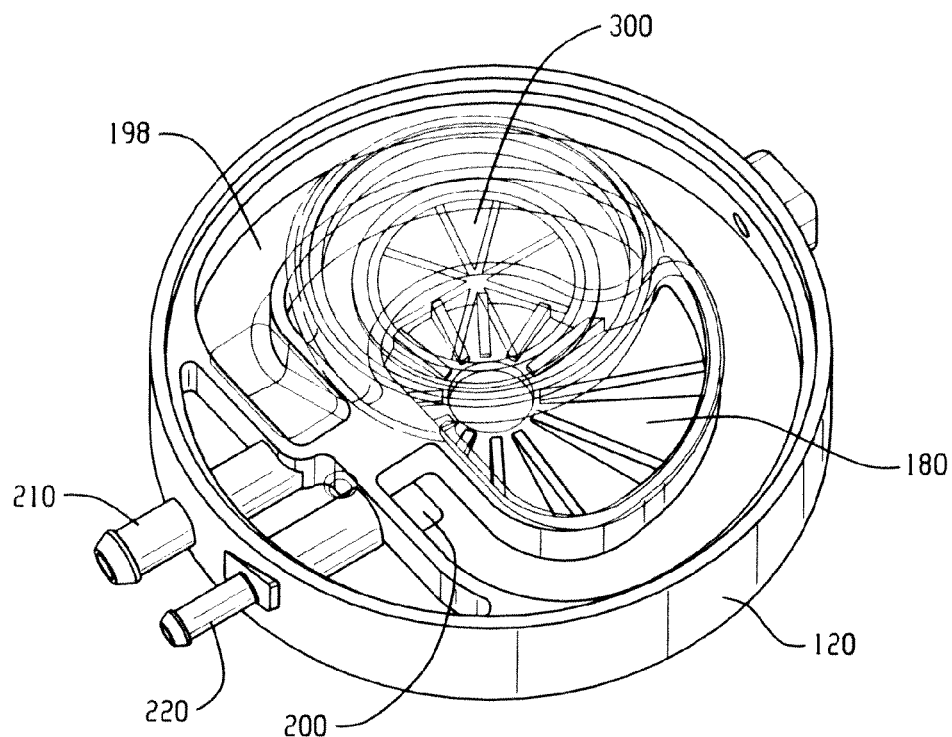
Figure 12:
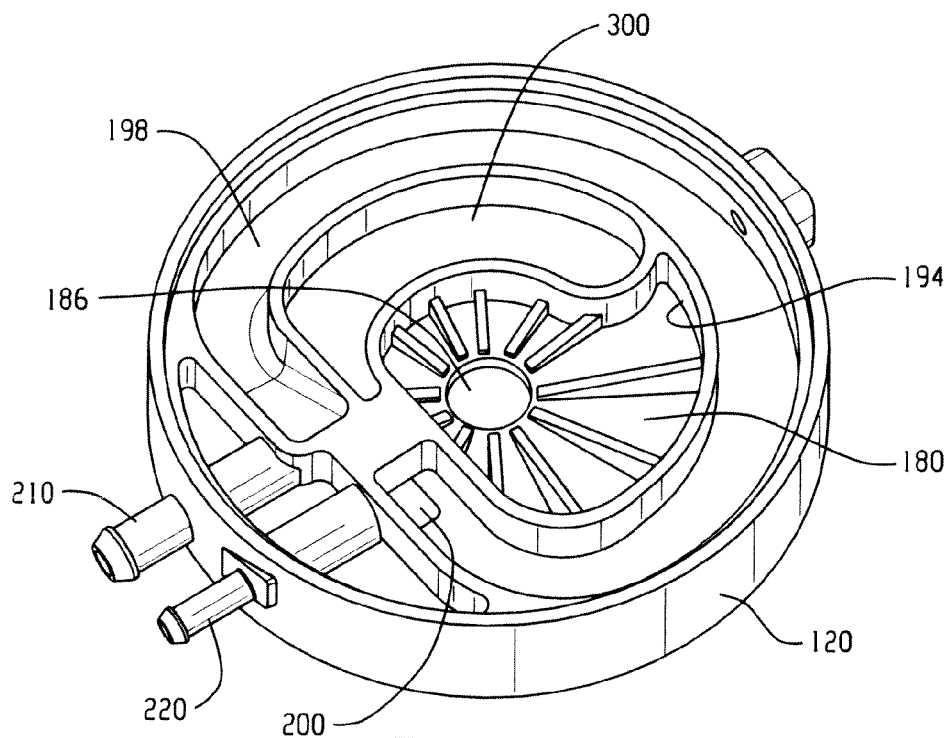
Figure 13:
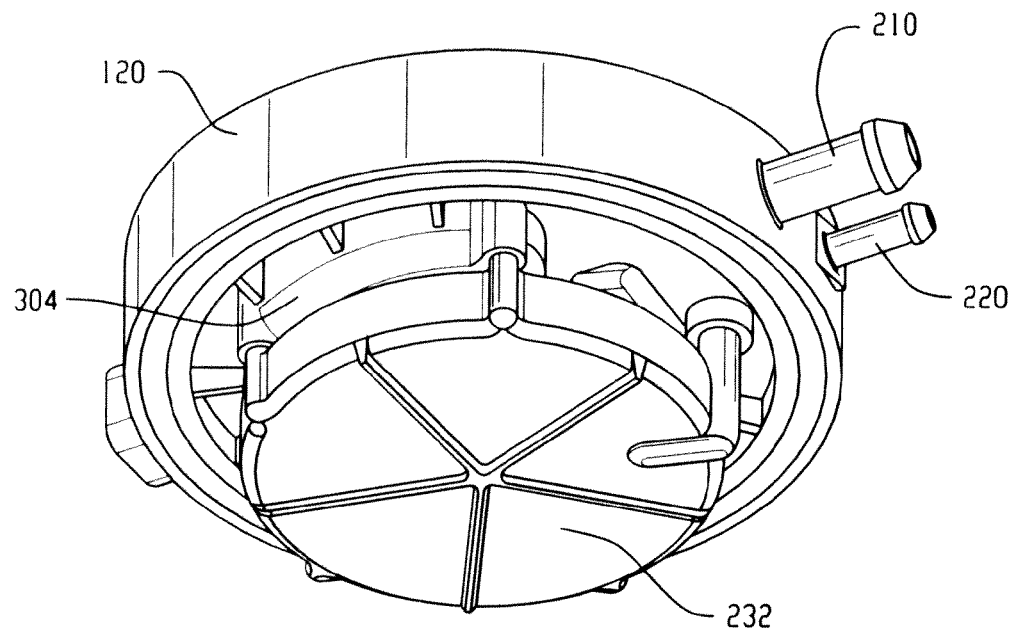
Figure 14:
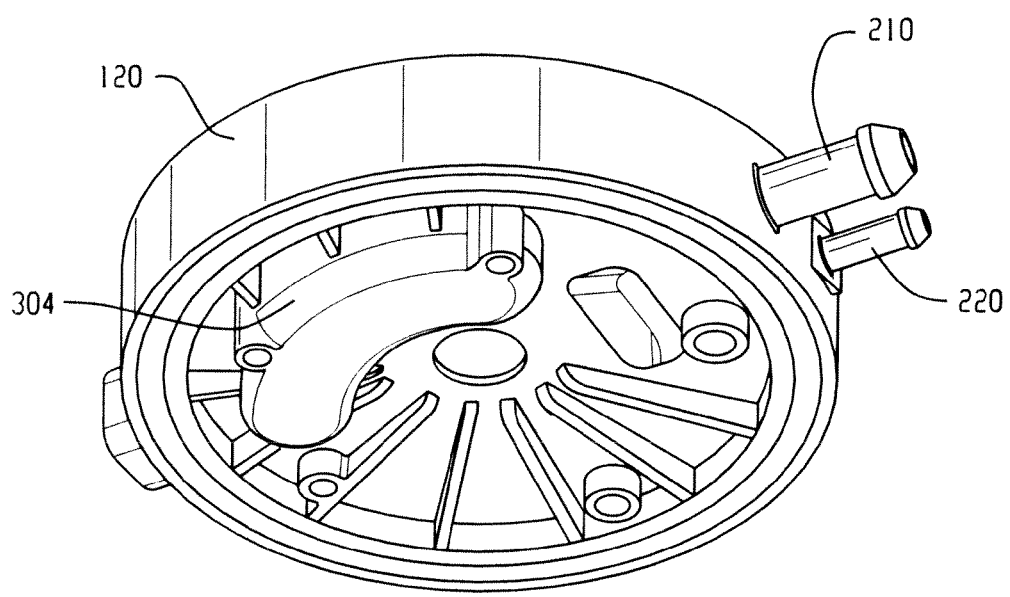

The passage or particular path for the negative pressure or vacuum to reach the underside of the idle diaphragm is more particularly illustrated in FIG. 8 where a valve (such as a solenoid valve, not shown) supplies negative pressure to port 220.

Ultimately, four different states or modes of operation are achieved. In a first state of the hydromount, when no vacuum is applied to either the decoupler 160 or the idle diaphragm 170, the decoupler 160 is allowed to freely oscillate creating a decoupled state for low input displacements. For higher input displacements, the fluid is forced through the low frequency inertia track 198 which exits into the low pressure side of the mount.

In a second state, when vacuum is applied to both the decoupler 160 and the idle diaphragm 170, the decoupler can no longer oscillate and the high frequency inertia track is opened (i.e., the idle diaphragm central portion 188 is retracted from opening 186). This causes the fluid to flow through the high frequency inertia track. This creates the high frequency dynamic rate dip that can be used, for example, to reduce idle disturbances at the rate dip frequency.

In a third state, when vacuum is applied to the decoupler 160 only and not the idle diaphragm 170, the fluid from the first fluid chamber is again forced through the low frequency inertia track 198 in order to reach the second fluid chamber.

This is the coupled state of the mount, which creates high levels of damping at low frequencies that can be used, for example, to damp road input vibrations.

In a fourth state of the switchable inertia track assembly of the mount, vacuum is applied to the idle diaphragm 170 only and not the decoupler 160. This state would allow the decoupler to oscillate freely for low displacement input, but fluid will flow through the high frequency inertia track at higher displacement inputs because the high frequency inertia track path is open.

The upper plate 184 (high pressure side of mount) is preferably made from metal, plastic, or composite material. The decoupler 160 is preferably made from metal, plastic, or composite material made from a metal, plastic, or composite support ring, and an elastomeric diaphragm material. The decoupler is retained and sealed to the center plate or housing 120 by the upper plate 184. The center plate is preferably made from metal, plastic, or composite material. The center housing contains most of the inertia track geometries and vacuum ports integrated into one part. The high frequency vacuum diaphragm 170 is preferably made from a metal, plastic, or composite support ring and an elastomeric diaphragm material.

The inertia track assembly contains both vacuum switching diaphragms. This makes it easier to assemble the switch into the remainder of the hydromount. The compact internal switches prevent potential shipping damage, as only the two vacuum ports are visible externally.

The invention does not use the diaphragm as part of the switching mechanism, thereby improving the durability and performance of the mount.

Again, when vacuum is applied to the decoupler port 210, the negative pressure causes the decoupler 160 to collapse. When vacuum is removed, the decoupler 160 is allowed to move freely. This vacuum switching mechanism, changes the mount from coupler (vacuum applied) to decoupled (vacuum removed). When vacuum is applied or removed from the idle diaphragm port 220, this causes the idle diaphragm 170 to collapse or extend, respectively. This opens and closes the high frequency idle track. This vacuum switching mechanism switches the mount from the high frequency inertia track (vacuum applied—port open) to the low frequency track (vacuum removed—port closed).

In a preferred process of assembly, the decoupler 160 is pressed into the decoupler housing. The decoupler cover 190 is ultrasonically welded to the decoupler housing, and the decoupler housing 184 is ultrasonically welded to the inertia track main 120. The decoupler port is ultrasonically welded into the inertia track main, and the idle diaphragm is pressed into the idle diaphragm housing 230. The idle diaphragm housing is ultrasonically welded to the idle diaphragm cover 232. Thereafter, the idle diaphragm housing assembly is ultrasonically welded to the inertia track main 120.

Figure 4:
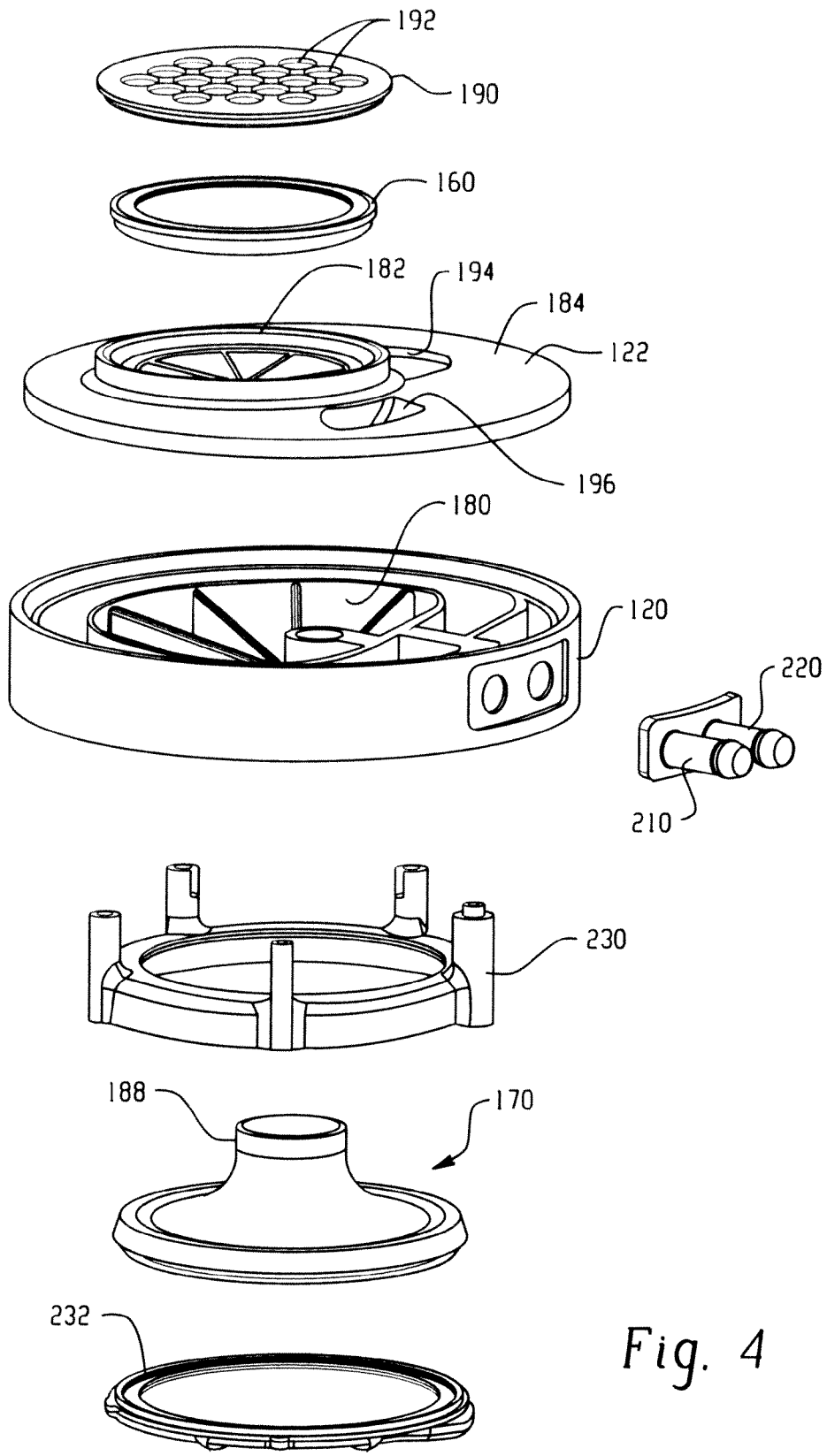
FIG. 4 is an exploded view of a first embodiment of the inertia track assembly.
Figure 5:
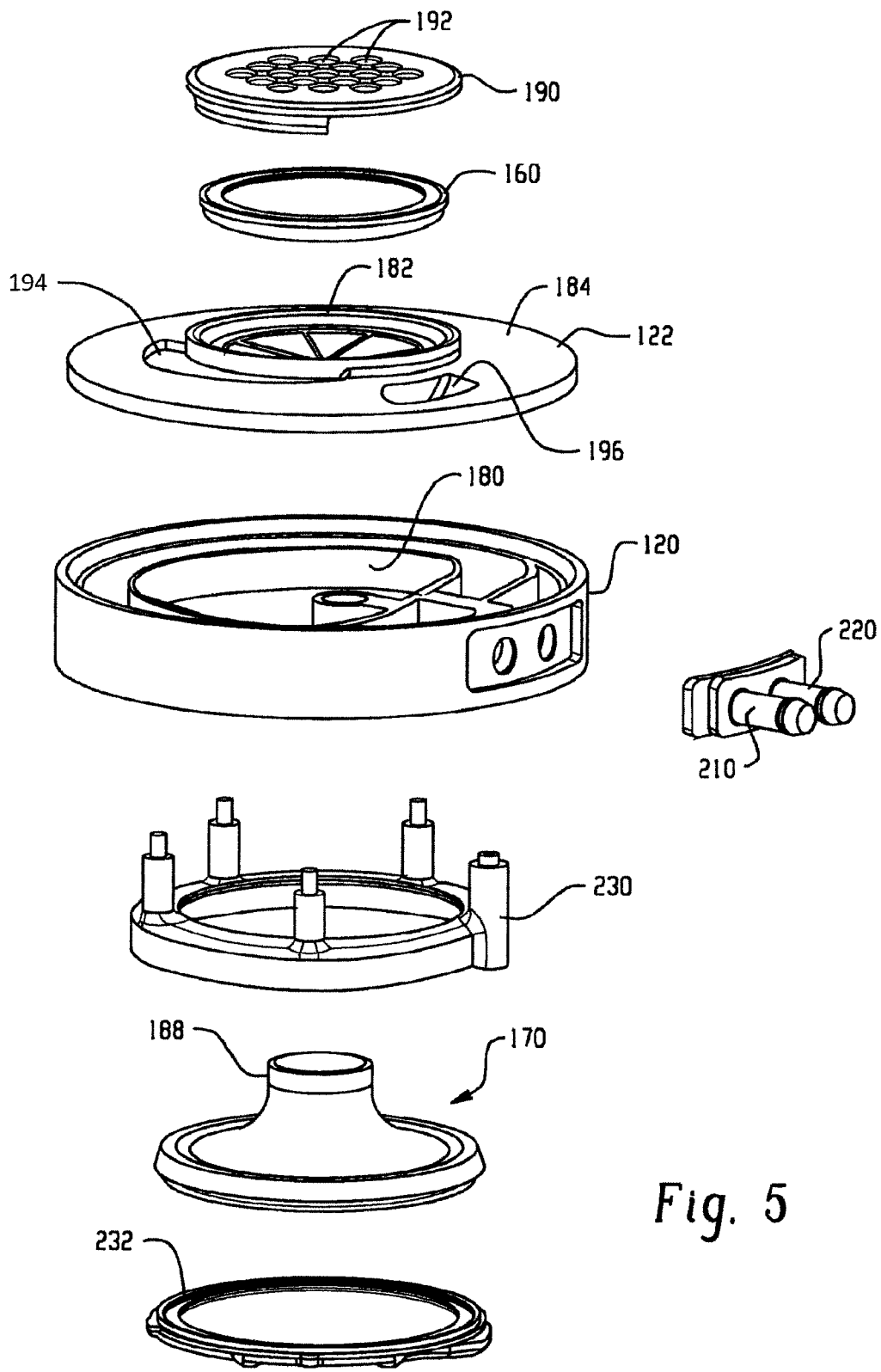
FIG. 5 is an exploded view similar to FIG. 4 of an alternative inertia track assembly.
Figure 6:
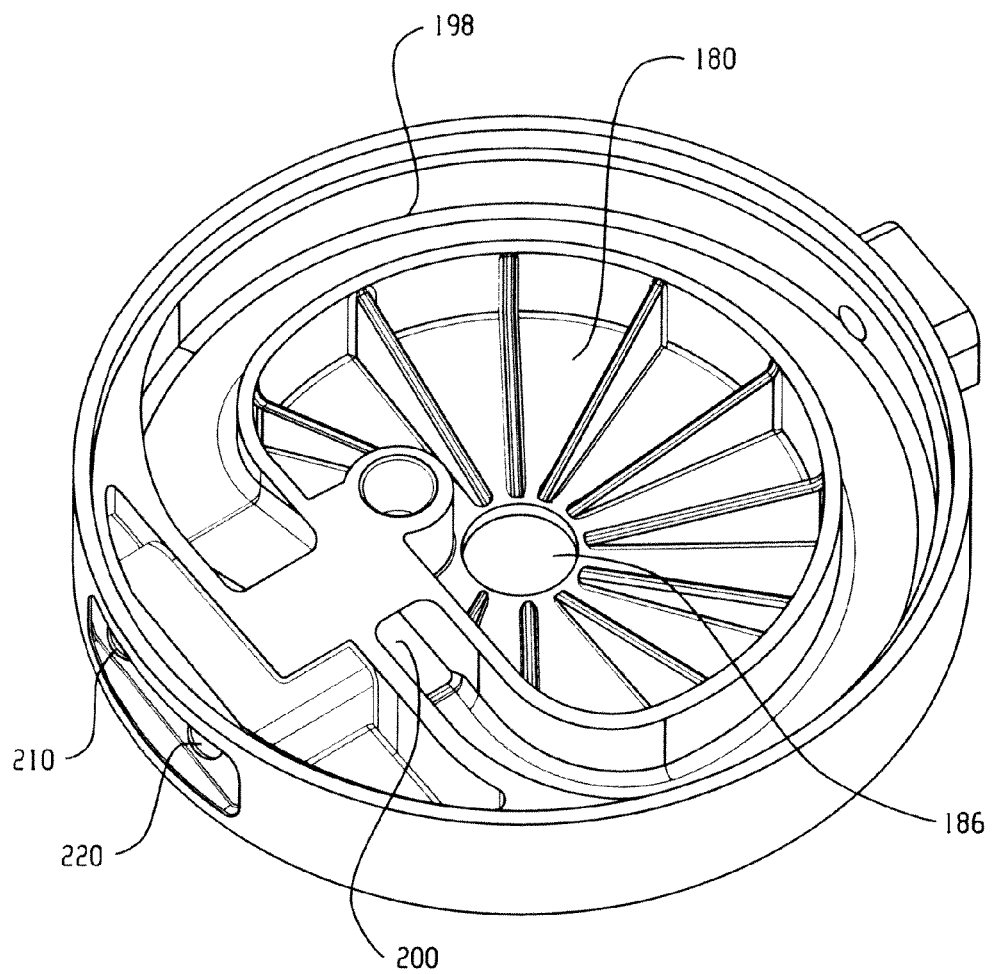
FIG. 6 is a perspective view of the inertia track main.

The embodiment of FIG. 5 is substantially identical to the FIG. 4 embodiment, except that many of the components include a metal such as aluminum and are not simply plastic. The assembly process includes pressing the decoupler 160 into the decoupler housing, and the decoupler cover 190 is crimped to the decoupler housing 182. The decoupler housing is pressed onto the inertia track main 120, and the decoupler port 210 is pressed into the inertia track main. The idle diaphragm 170 is pressed into the idle diaphragm housing 230, and the idle diaphragm housing is ultrasonically welded to the idle diaphragm cover 232. The idle diaphragm housing assembly is then ultrasonically welded to the inertia track main 120.

The invention is intended to function properly with little degradation to performance in the −40 C to +120 C temperature range.

FIGS. 9-14 illustrate another embodiment and for purposes of consistency and brevity like components will be identified by like reference numerals, and new components will be identified by new numerals. More particularly, an inertia track assembly 122 integrates an accumulator or buffering means 300 into the inertia track assembly. The accumulator 300 is added to the existing multi-state inertia track design to prevent vacuum line resonance in the "drive-away" or default state of the mount. In the default state, i.e., when no vacuum is being applied to either port 210, 220, movement of the rubber decoupler 160, for example, will pump air in and out of the bounce port or decoupler port 210. This oscillation will cause the air in any tube or passage attached to that port to go into resonance. The magnitude and frequency of this resonance will be effected by the inside diameter, stiffness, and length of the attached tube. This air resonance will increase the stiffness of the mount when forced vibrations are applied at post-resonant frequencies to the mount 100. This negatively effects the isolation of the mount at these frequencies.

The accumulator 300 effectively reduces or eliminates this air resonance response as the accumulator is preferably located in-line between the decoupler 160 and the port 210, buffering the pumping effect of the decoupler. This is believed to be the first known application of an air accumulator in a vacuum actuated hydraulic mount.

The larger the accumulator 300, the greater the effect. Thus, as evident in FIGS. 9-14, and particularly FIGS. 11 and 12, the accumulator is physically integrated into the inertia track assembly 122. This arrangement is in direct contrast to the current state of the art where an external accumulator must be used which adds undesirable cost and mass, as well as difficulties in packaging the external accumulator. In FIG. 7, the port 210 is shown as continuing in size/dimension as the port communicates with internal passage 302 that leads from the port to the decoupler 160. As described above, when vacuum is applied to the vacuum port 210 and then proceeds through passage 302 to the decoupler 160 collapses and can no longer oscillate. However in the default state, e.g., when no vacuum is applied to either port 210, 220, movement of the rubber decoupler 160 will pump air in and out of the bounce port or decoupler port 210 which results in the undesired pumping and air resonance response described above. By incorporating the enlarged accumulator chamber 300 between the port and the decoupler, the pumping/resonance response is reduced or eliminated. In the exemplary embodiment, the accumulator 300 has a volume on the order of 18 to 20 cc, although these dimensions are exemplary only and should not be deemed limiting. Thus, the communication of the substantially constant dimension passage 302 with the enlarged cross-section and volume provided by the integrated accumulator 300 provides the desired buffering of any potential pumping effect that could result from the freely oscillating decoupler in the decoupled state. Incorporating the integrated accumulator into the inertia track assembly 120 is accomplished with a corresponding reduction in the size of the first path 180 (compare FIG. 6 with FIG. 12) but this reduction in the dimension of path 180 does not adversely impact operation/communication through the high frequency inertia track. Likewise, integrating the accumulator 300 into the structure does not adversely impact other functions or states of the mount. The accumulator can be enlarged by extending from a lower surface 304 of the inertia track assembly housing (FIGS. 13-14) if additional volume is desired.

The invention has been described with reference to the preferred embodiment. Modifications and alterations will occur to others upon reading and understanding this specification. It is intended to include all such modifications and alterations in so far as they come within the scope of the appended claims or the equivalents thereof.

We claim:

1. A multistage switchable inertia track assembly comprising:
    a housing;
    an inertia track received in the housing and having an elongated fluid damped first path that is adapted to communicate with an associated first fluid chamber on a first side and an associated second fluid chamber on a second side, and a second path that communicates with the associated first and second fluid chambers, the first side of the inertia track forming a portion of the first fluid chamber, and the second side of the inertia track forming a portion of the second fluid chamber;
    a decoupler received in the housing between the first and second fluid chambers;
    an idle diaphragm in the housing that has a first surface that forms a part of the second fluid chamber and selectively controls communication between the first and second fluid chambers to selectively alter the damping; and
    first and second ports in the inertia track that separately communicate with the decoupler and with a second surface of the idle diaphragm, respectively, the first and second ports configured to be selectively connected to vacuum or no vacuum such that the assembly is configured to be operated in four modes, comprising:
    in a first mode the first and second ports are connected to vacuum so that the decoupler no longer oscillates and the idle diaphragm opens the second path through the inertia track,
    in a second mode no vacuum is applied to either the first port or the second port so that the decoupler freely oscillates and the idle diaphragm closes the second path through the inertia track whereby fluid must flow from the first chamber to the second chamber through the first path,
    in a third mode vacuum is applied to the first port only and not to the second port so that the idle diaphragm closes the second path through the inertia track and fluid from the first chamber to the second chamber must pass through the first path, and
    in a fourth mode vacuum is applied to the second port only and not to the first port so that the decoupler oscillates freely for a first predetermined displacement input but fluid will flow through the open second path through the inertia track.

2. The assembly of claim 1 wherein the assembly is dimensioned for receipt in a fluid-filled mount to segregate the first fluid chamber and the second fluid chamber therein.

3. The assembly of claim 1 whereby a second predetermined displacement input forces fluid through the first path, wherein the second predetermined displacement input is larger than the first predetermined displacement input.

4. The assembly of claim 1 further comprising a diaphragm enclosing a portion of the second fluid chamber.

5. The assembly of claim 1 wherein the housing encloses a remaining portion of the second fluid chamber.

6. The assembly of claim 1 further comprising a main rubber element that encloses a portion of the first fluid chamber.

7. The assembly of claim 1 further comprising an accumulator integrated into the housing between the first port and the decoupler.

8. The assembly of claim 7 wherein the accumulator has a substantially enlarged dimension relative to a passage extending from the first port to the decoupler.

9. A method of manufacturing a multistage switchable inertia track assembly comprising:
    providing a housing;
    positioning an inertia track in the housing that has an elongated fluid damped first path that is adapted to communicate with an associated first fluid chamber on a first side and an associated second fluid chamber on a second side, and a non-damped second path with reduced damping in comparison to the first path that is adapted to communicate with the associated first and second fluid chambers, a first side of the inertia track forming a part of the first fluid chamber, and a second side of the inertia track forming a part of the second fluid chamber;
    securing a decoupler in the housing to direct fluid through the first path according to input displacement;
    supplying an idle diaphragm in the housing that has a first surface that forms a part of the second fluid chamber and that selectively controls communication between the first and second fluid chambers to selectively alter the damping state; and
    providing a first port in the inertia track to communicate with the decoupler and a separate second port in the inertia track to communicate with a second surface of the idle diaphragm, selectively connecting the first and second ports to vacuum, wherein applying
    (i) vacuum to both the first and second ports prevents the decoupler from oscillating and fluid from the first chamber to the second chamber passes through the open second path,
    (ii) no vacuum to either the first port or the second port allows the decoupler to oscillate, the idle diaphragm closes the second path through the inertia track and fluid must flow from the first chamber to the second chamber through the first path,
    (iii) vacuum to the first port only and not to the second port, the idle diaphragm closes the second path through the inertia track and fluid from the first chamber to the second chamber must pass through the first path, and
    (iv) vacuum to the second port only, the decoupler oscillates freely for a predetermined displacement input but fluid will flow through the open second path through the inertia track.

10. The method of claim 9 further comprising sealing the housing in a vehicle mount to define the associated first and second fluid chambers on the opposite first and second sides.

11. The method of claim 9 further comprising providing a first elastomeric member that encloses the first fluid chamber with the housing.

12. The method of claim 9 further comprising sealing a peripheral portion of the housing on the second side to define the second fluid chamber.

13. The method of claim 9 wherein the peripheral portion sealing step includes providing a diaphragm to enclose the second fluid chamber with the housing.

14. The method of claim 9 further comprising clamping the first elastomeric member and the diaphragm against peripheral portions of opposite sides of the housing.

15. The method of claim 9 wherein the clamping step includes positioning the housing between the first elastomeric member and the diaphragm within an external shell.

16. The method of claim 9 including providing access to the first and second ports through the shell.

17. The method of claim 9 wherein the first and second ports extend through a peripheral region of housing that is sealed from the first and second fluid chambers.

18. The method of claim 9 including integrating an accumulator into the housing between the first port and the decoupler.

* * * * *